April 1, 1930.                    J. OSSANNA ET AL                    1,752,649
                        SYSTEM OF CONNECTIONS FOR COMPENSATING
                        Filed Dec. 23, 1927           2 Sheets-Sheet 1
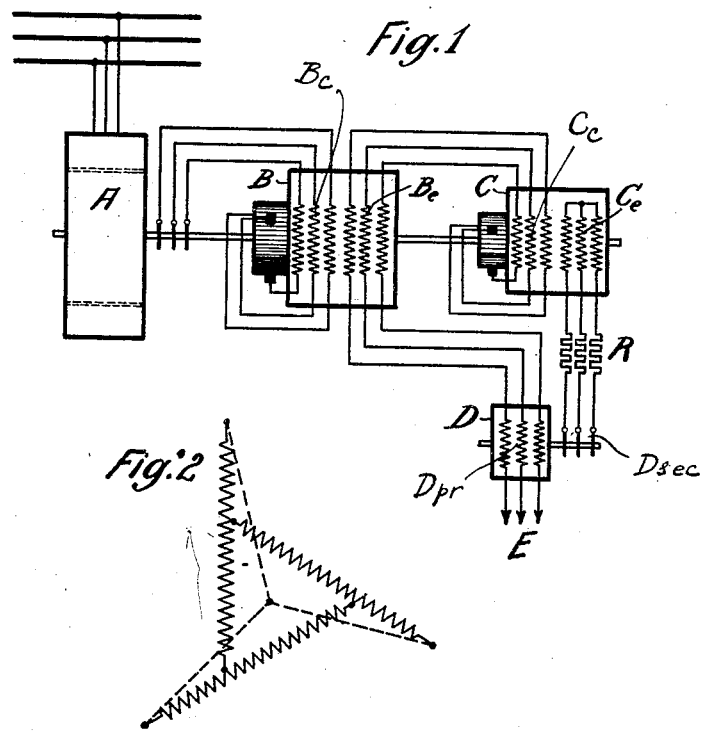
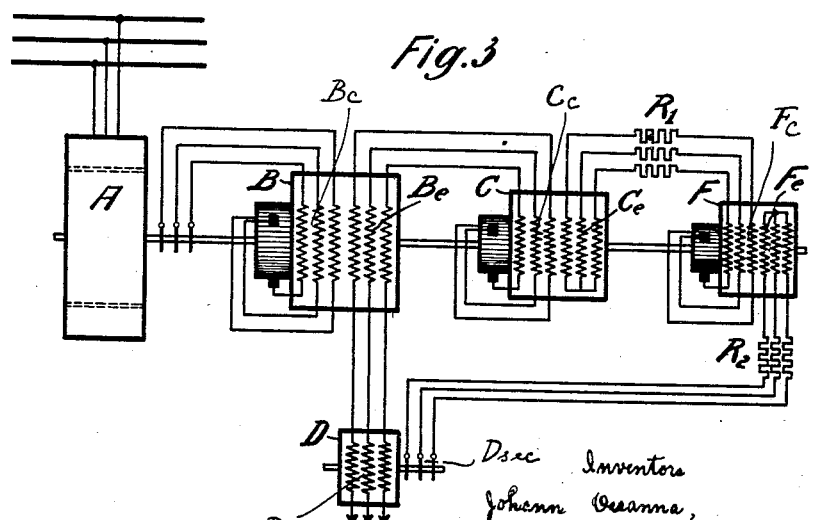

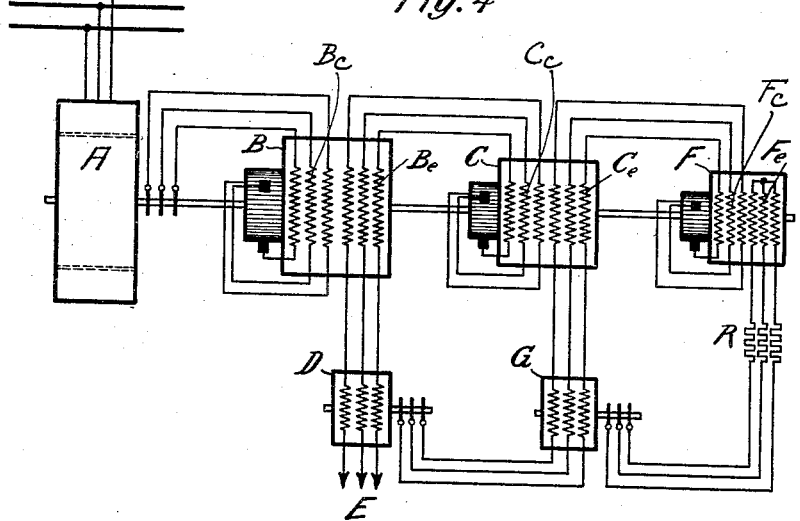
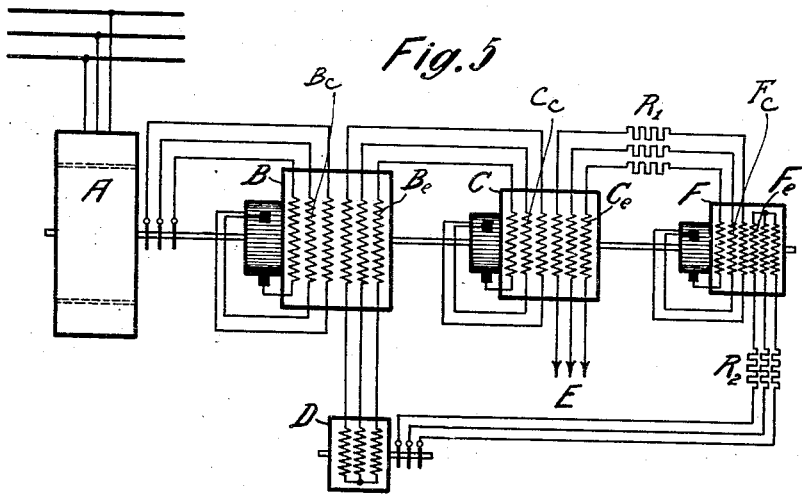

Patented Apr. 1, 1930

1,752,649

UNITED STATES PATENT OFFICE

JOHANN OSSANNA AND HANS GRANER, OF MUNICH, AND FRITZ HOFMANN, OF MUNICH-TALKIRCHEN, GERMANY, ASSIGNORS TO SIEMENS-SCHUCKERTWERKE AKTIENGE-SELLSCHAFT, OF BERLIN-SIEMENSSTADT, GERMANY, A CORPORATION OF GERMANY

SYSTEM OF CONNECTIONS FOR COMPENSATING

Application filed December 23, 1927, Serial No. 242,198, and in Germany December 15, 1926.

Our invention relates to a system of connections for compensating the inductive resistance of windings which are traversed by alternating electric currents of variable frequency.

Our invention relates more specifically to asynchronous electric machines the speed regulating commutator machine of which, being connected in the secondary circuit of the asynchronous machine, possesses in its own stator an exciter winding carrying a slip frequency current by which the inductive resistance is compensated.

In order to regulate the output of the asynchronous machine in its two components of effective and wattless output, it is necessary to supply to the exciter winding in the stator of the aforementioned commutator rear machine currents of corresponding value, phase and frequency which originate from a certain source of current which need not be further entered into in the following. The said exciter currents have the desired value and phase only, if the inductive resistance of the exciter winding of the commutator rear machine or the inductive resistance of the entire exciter circuit at any slip frequency is small in comparison with the ohmic resistance. This might be obtained by connecting a non-inductive resistance of suitable value in the circuit of the exciter winding. This method has however, the disadvantage of great losses.

In the system of connections according to our invention the inductive resistance of a winding carrying alternating current of variable frequency is compensated by connecting in the circuit of the winding on the one hand a commutator machine preferably running at a constant speed and on the other hand the primary winding of a substantially non-reactive transformer, in particular an induction type voltage regulator. The secondary winding of this transformer or regulator feeds an exciter winding in the stator of the said commutator machine.

Our invention is illustrated in the drawings affixed hereto and forming part of our specification.

These drawings represent in

Fig. 1, a diagram of one embodiment of our invention,

Fig. 2, the wiring diagram of the windings of the transformer D in Fig. 1, and in Figs. 3, 4 and 5 a number of other embodiments of our invention.

Like parts are indicated by like letters of reference in all figures of the drawings.

Referring to Fig. 1, A is an asynchronous machine the speed or the phase compensation of which is to be regulated and in the secondary circuit of which is connected a commutator rear machine B. The commutator rear machine is mechanically coupled with the asynchronous machine; in the stator it possesses an exciter winding $B_e$ besides the compensation winding $B_c$. The exciter winding $B_e$ is at E fed with slip frequency from a source of current which it is unnecessary to describe more specifically. In the circuit of the exciter winding are connected the armature and the compensation winding $C_c$ of a second commutator machine C and the primary winding of an induction type regulator or of a static transformer or in short, of a transformer D. The exciter winding $C_e$ of this second commutator machine is fed from the secondary winding of the transformer D. In order to keep the wattless resistance of this second exciter circuit small for all frequencies coming into consideration in comparison with the ohmic resistance, a resistance R of suitable value is provided in the system shown in Fig. 1 of the drawings. This may be done without any substantial loss because the output loss in this resistance is very much smaller than in the known system of connections. The dimensions of the transformer D should be so chosen that the reaction of the secondary currents on the primary winding is negligible, which can be attained by an artificial increment of the magnetic resistance (for instance by providing an air-gap). In this way the secondary voltage of the transformer becomes proportional to the primary current and its frequency.

If an induction type regulator is employed the desired phase of the exciter current in the exciter winding $C_e$ and thus also the voltage of the rear machine C may be attained by turning the stator of the regulator in relation to the rotor. It is thus possible to generate in the rear machine C a voltage which leads by 90° in relation to the exciter current in the exciter winding $B_e$ and which is thus opposite in direction to the self-induction voltage in the winding $B_e$.

If on the other hand a static transformer is used an accurate adjustment of the desired phase of the exciter current in the winding $C_e$ is not possible without special provisions. Since, however, the phase of the exciter current generated is approximately satisfactory even without artificial measures, it is easy to adjust the desired phase accurately by artificial means, for instance by the system of connections according to Fig. 2 of the drawings.

The induction voltage regulator D becomes in the arrangement according to Fig. 1 of the drawings comparatively large. A considerable reduction of the size of the induction regulator may be attained according to Fig. 3 of the drawings by providing a third compensated machine F, which has the task of feeding the exciter winding $C_e$ through a resistance $R_1$. The secondary voltage of the induction regulator D then feeds the exciter winding $F_e$ through a resistance $R_2$. Since the exciter winding $F_e$ requires for its excitation a ten to twenty times smaller wattless output than the exciter winding $C_e$ the induction voltage regulator D also becomes ten to twenty times smaller than in the system shown in Fig. 1 of the drawings.

As a matter of course the size of the induction type voltage regulator could be still further reduced by providing a fourth commutator machine which would have to feed the exciter winding $F_e$ and the exciter winding of which would have to be connected to the secondary winding of the induction voltage regulator.

The size of the induction voltage regulator may also be reduced by compensating the wattless resistance in the exciter circuit $C_e$ of the system illustrated in Fig. 1 of the drawings. This may be effected in various ways. The compensation of the wattless resistance of the exciter winding $C_e$ may, for instance, be effected in the same way as in the case of the exciter winding $B_e$ viz by providing a second commutator machine F and a second transformer G, as shown in Fig. 4 of the drawings. Any other suitable compensation connection may, however, be chosen, such as a phase compensator which runs at a speed proportional to the slip frequency.

In the Figs. 1, 3 and 4 of the drawings it has been assumed that the speed regulating machines are mounted upon the same shaft with the main machine. This is, however, immaterial for the action of the system.

In the examples described so far the exciter voltage is always assumed as being supplied to the exciter winding $B_e$ of the slip output machine. This is not absolutely necessary and the exciter voltage may equally well be applied to the circuits of the exciter winding of any of the speed regulating machines, for instance in the system shown in Fig. 1 to the exciter circuit of the winding $C_e$ and in the systems illustrated in Figs. 3 and 4 to the exciter circuit of the winding $C_e$ or $F_e$. In Fig. 5 the exciter voltage is applied to the circuit of the winding $C_e$, for instance. The machine C then serves not only for the compensation of the reactive resistance of the exciter winding $B_e$ but also as exciter. In this way the necessary exciter output is greatly reduced and consequently also the output of the machines which have to generate the exciter voltage.

Various modifications and changes may be made without departing from the spirit and the scope of the invention, and I desire, therefore, that only such limitations shall be placed thereon as are imposed by the prior art.

I claim as my invention:—

1. In an electric circuit carrying alternating currents of variable frequency in combination, a self-inductive winding, a commutator machine connected in circuit with said winding, an exciter winding on said commutator machine, a transformer connected with its primary winding in circuit with said self-inductive winding so that the current in said primary winding is proportional to the current in said self inductive winding, and means for feeding the exciter winding of the commutator machine from the secondary winding of the transformer, said transformer being dimensioned in size, and being phase-adjusted in its secondary winding so that the voltage, supplied by the transformer to the variable frequency circuit through said commutator machine, compensates the self induction voltage produced in said self-inductive winding.

2. In an electric circuit carrying alternating currents of variable frequency in combination, a self-inductive winding, a commutator machine connected in circuit with said winding, an exciter winding in the stator of the commutator machine, a compensation winding in the stator of the commutator machine, a transformer connected with its primary winding in circuit with said self-inductive winding so that the current in said primary winding is proportional to the current in said self-inductive winding, and means for feeding the exciter winding of the commutator machine from the secondary winding of the transformer, said transformer being dimensioned in size, and being phase-adjusted in its secondary winding so that the voltage, supplied by the transformer to the variable frequency circuit through said commutator machine, compensates the self induction voltage produced in said self-inductive winding.

3. In an electric circuit carrying alternating currents of variable frequency in combination, a self-inductive winding, a commutator machine connected in the circuit with said winding, an exciter winding in the stator of the commutator machine, an induction type voltage regulator connected with its primary winding in circuit with said self-inductive winding so that the current in said primary winding is proportional to the current in said self-inductive winding, and means for feeding the exciter winding of the commutator machine from the secondary winding of said regulator, said voltage regulator being dimensioned in size and being phase-adjusted in its secondary winding so that the voltage supplied by the regulator to the variable frequency circuit through said commutator machine, compensates the self induction voltage produced in said self-inductive winding.

4. In an electric circuit carrying alternating currents of variable frequency in combination, a self-inductive winding, a commutator machine connected in circuit with said winding, an exciter winding in the stator of the commutator machine, a second commutator machine connected in the circuit of the exciter winding of the first commutator machine, a transformer having its primary winding connected in circuit with said self-inductive winding so that the current in said primary winding is proportional to the current in said self-inductive winding, and means for feeding the exciter winding of the second commutator machine from the secondary winding of the transformer, said transformer being dimensioned in size, and being phase-adjusted in its secondary winding so that the voltage, supplied by the transformer to the variable frequency circuit through said second commutator machine, compensates the self induction voltage produced in said self-inductive winding.

5. The combination with an asynchronous machine, of a speed regulating commutator machine connected in the secondary circuit of said asynchronous machine, a slip frequency carrying exciter winding in the stator of said speed regulating machine, an auxiliary commutator machine connected in the circuit of said exciter winding, an exciter winding in the stator of said auxiliary commutator machine, a transformer having its primary winding connected in circuit with the exciter winding of said speed regulating machine, and means for feeding the exciter winding of said auxiliary commutator machine from the secondary winding of said transformer, said transformer being dimensioned in size and being phase-adjusted in its secondary winding so that the voltage supplied by it to the exciter winding of the speed regulating machine, by way of said auxiliary commutator machine, compensates the voltage induced in said exciter winding.

In testimony whereof we affix our signatures.

JOHANN OSSANNA.
HANS GRANER.
FRITZ HOFMANN.